United States Patent [19]

Bampton

[11] Patent Number: 4,820,355
[45] Date of Patent: Apr. 11, 1989

[54] METHOD FOR FABRICATING MONOLITHIC ALUMINUM STRUCTURES

[75] Inventor: Clifford C. Bampton, Thousand Oaks, Calif.

[73] Assignee: Rockwell International Corporation, El Segundo, Calif.

[21] Appl. No.: 31,637

[22] Filed: Mar. 30, 1987

[51] Int. Cl.[4] ............................................. C22F 1/04
[52] U.S. Cl. .......................... 148/11.5 A; 148/11.5 Q; 148/12.7 A; 428/586; 428/654; 228/118; 228/157; 228/231; 228/232; 29/157.3 V
[58] Field of Search ............... 148/11.5 A, 11.5 Q, 148/12.7 A, 127; 428/586; 228/118, 157, 231, 232; 29/157.3 V

[56] References Cited

U.S. PATENT DOCUMENTS

| | | | |
|---|---|---|---|
| 3,354,531 | 11/1967 | Pryor | 148/11.5 A |
| 4,361,262 | 11/1982 | Israeli | 228/118 |
| 4,392,602 | 7/1983 | Darby | 228/118 |
| 4,549,685 | 10/1985 | Paez | 228/118 |

FOREIGN PATENT DOCUMENTS 2109711 6/1983 United Kingdom ............... 228/157

Primary Examiner—L. Dewayne Rutledge
Assistant Examiner—George Wiszomierski
Attorney, Agent, or Firm—Max Geldin; Charles T. Silberberg

[57] ABSTRACT

A method for forming monolithic structures from a plurality of aluminum or aluminum alloy sheets is provided which integrates a method for producing a selective fine grain structure in each of the sheets, with roll bonding and superplastic forming. The sheets are subjected to isothermal aging or controlled slow cooling to obtain a desired grain size in each of the respective sheets. Different heating and cooling treatments can be individually applied to each of the sheets so that the sheets can be tailored to have a fine grain or a coarser grain. Stop-off material is applied at selected areas of the sheets, and the resulting stack of sheets is subjected to cold roll bonding to bond adjacent surfaces of the sheets where stop-off material has not been applied. The roll bonding step also serves to plastically deform the sheets. The roll-bonded stack of sheets is then subjected to rapid heating for recrystallization of one or more of the sheets into a fine grain structure. After recrystallization, the sheets are subjected to superplastic forming into the desired monolithic structure.

33 Claims, 2 Drawing Sheets

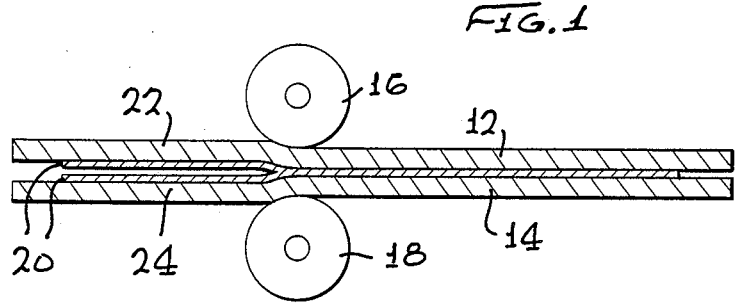
FIG. 1
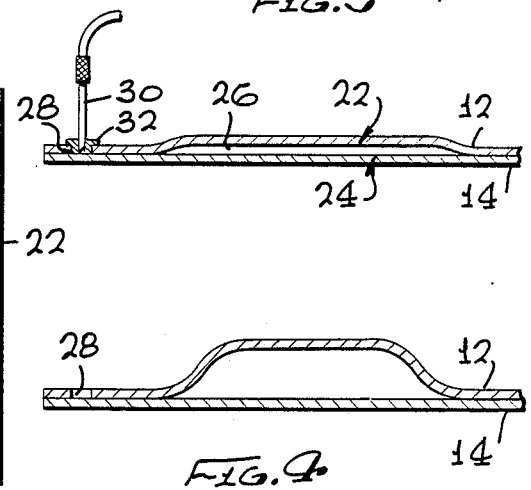
FIG. 3
FIG. 2
FIG. 4
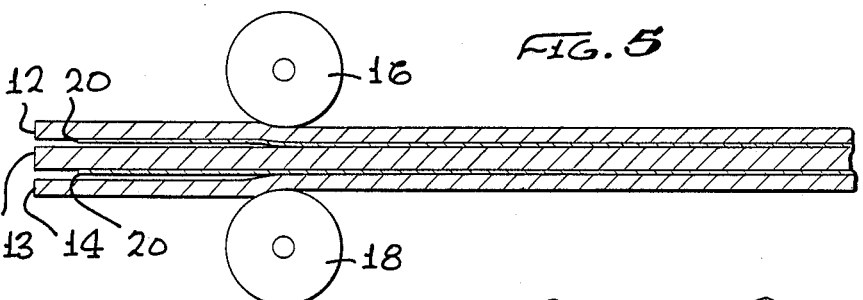
FIG. 5
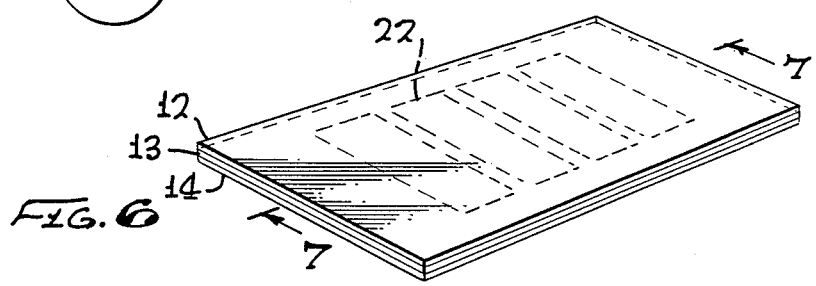
FIG. 6

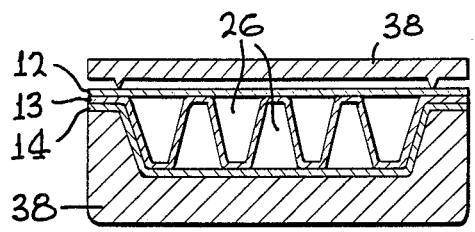
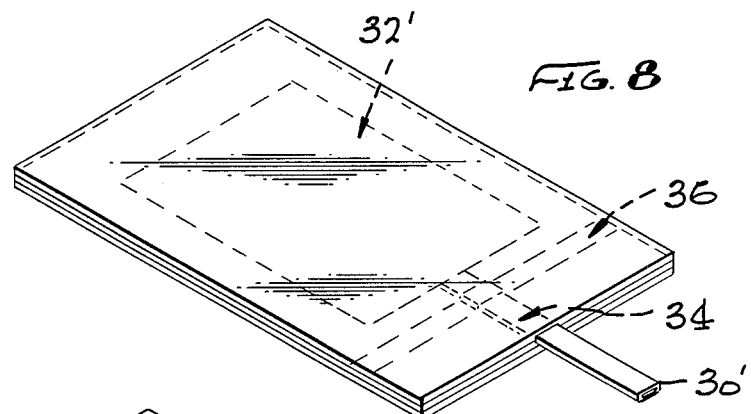
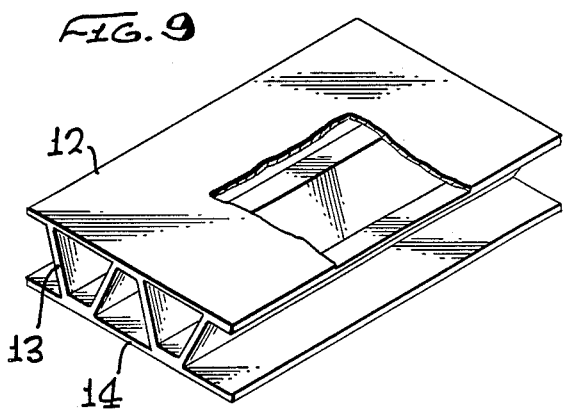
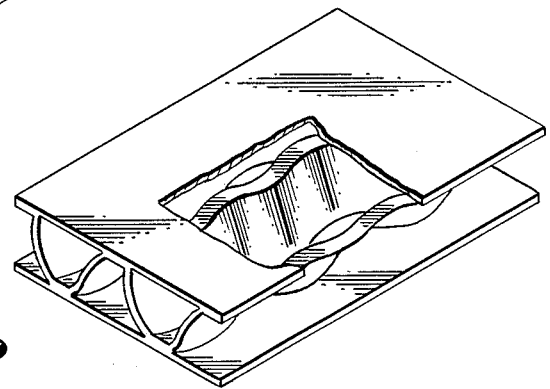

METHOD FOR FABRICATING MONOLITHIC ALUMINUM STRUCTURES

BACKGROUND OF THE INVENTION

This invention relates to the fabrication of structures formed particularly from aluminum or its alloys and is particularly directed to aluminum or aluminum alloy structures, such as metallic sandwich structures, fabricated by a method involving fine grain development of at least one component of the structure, in conjunction with roll bonding and superplastic forming.

Aluminum and its alloys have been formed into structural materials by diffusion bonding, and particularly roll bonding, and superplastic forming. However, roll bonding and superplastic forming are difficult to carry out for many aluminum alloys, particularly those which are heat treatable to high strengths. It is accordingly desirable that aluminum alloys have a fine grain structure in order to be more readily deformed and elongated during the roll bonding and superplastic forming procedure. However, although methods have been developed to impart a fine grain size to aluminum alloys, such procedures have not heretofore been successfully applied for selectively roll bonding and superplastic forming aluminum alloys into desired structures.

U.S. Pat. No. 4,092,181 to Paton, et al, describes a method of imparting a fine grain structure to precipitation hardenable aluminum alloys. The alloy is first heated to a solid solution temperature to dissolve the precipitating constituents in the alloy, and the alloy is then cooled, preferably by water quenching, to below the solution temperature. The alloy is then overaged to form precipitates by heating at above the precipitation hardening temperature for the alloy but below its solution treating temperature. Strain energy is introduced into the alloy by plastically deforming it at or below the overaging temperature used. The alloy is then held at a recrystallization temperature resulting in the development of the grains in a fine grain structure.

U.S. Pat. No. 4,222,797 to Hamilton, et al, discloses a method similar to that of No. 4,092,181 and describes additional conditions for minimizing the grain size. According to this patent, strain energy is introduced into the alloy by plastically deforming it in a temperature range of 380° F. to 450° F. to reduce its cross-sectional area a total of 40 percent minimum, at least 25 percent of the reduction in area being accomplished in a single continuous deformation operation.

U.S. Pat. No. 4,490,188 to Bampton discloses a method for imparting a fine grain structure to 2,000 and 7,000 series aluminum alloy. The alloy is solution treated and overaged to provide a suitable precipitate. It is then softened and stabilized so that it can be cold rolled at room temperature without cracking. After cold rolling the alloy is held at recrystallization temperature so that new grains are nucleated and grow to form a fine grain structure.

U.S. Pat. No. 4,434,930 to Trenkler, et al, describes a method for roll bonding and gas expanding metal sheets into composite structures. The process comprises providing at least two flat sheets of malleable metal, such as aluminum, and providing a selected pattern of stop-off material between at least two adjacent metal sheets, the stop-off material being thermally decomposable to generate a gas when raised above a given temperature, a first portion of stop-off material generating gas at the sintering temperataure and the second portion generating gas above a predetermined temperature higher than the sintering temperature. Such procedure, however, often results in separation and deformation of the sheets contiguous to the stop-off material.

Typically, a three-sheet truss core sandwich structure made using prior art methods has a thin center core sheet. The center sheet is thinner than the outer sheets so that it can be superplastically elongated to a greater degree than the outer sheets in order to achieve the desired central reinforcing structure without putting undesired grooves or pillows in the outer sheets. However, after superplastic forming, this central sheet was often too thin to provide the sandwich structure with the necessary compressive strength to prevent collapse of the structure upon the application of pressures of normal use. Thus, prior art methods have the disadvantage of typically being unable to produce sandwich structures having a strong central reinforcement structure unless excessively thick starting gauges are used for the outer sheets, often requiring expensive chemical thinning stages, after the superplastic forming stage, to achieve minimum weight of the part.

It is an object of the present invention to provide a method for producing aluminum structures from a plurality of heat treatable aluminum components or sheets, by imparting a fine grain structure to at least one of such sheets in conjunction with the steps of roll bonding and superplastic forming the sheets.

Another object of the invention is to provide an effective method for fabricating aluminum alloy structures, such as truss core sandwich structures, from a plurality of contiguous heat treatable aluminum alloy sheets, by imparting a desired fine grain structure to at least one of such sheets, particularly the center sheet, in conjunction with roll bonding and superplastically forming the aluminum alloy sheets.

Still another object of the invention is the provision of a method for roll bonding and superplastically forming a plurality of aluminum alloy sheets, including heat treating at least one of the sheets both prior to and following roll bonding to produce a fine grain structure which particularly facilitates the superplastic forming operation.

SUMMARY OF THE INVENTION

According to the invention, there is provided a method for producing a monolithic aluminum alloy structure, such as a truss core sandwich structure, from a plurality of aluminum alloy sheets, which comprises the steps of:

imparting a desired microstructure selectively to the respective sheets by isothermal aging or by aging under controlled slow cooling, providing stop-off material at selected areas of opposing surfaces of the sheets where it is desired that the sheets not be bonded together, stacking the sheets, roll bonding the outer surfaces of the stack of sheets, the roll bonding pressure being of a sufficient magnitude to physically deform the sheets, and bonding the sheets together at portions thereof where the stop-off material has not been applied, rapidly heating the roll-bonded stack of sheets under conditions to recrystallize the alloy in one or more of the sheets into a fine grain structure, and superplastically forming the stack of sheets into a desired monolithic structure.

Various aging and heat treatment procedures can be carried out prior to roll bonding of the stack of aluminum alloy sheets to facilitate production of a fine grain aluminum alloy structure in at least one of the sheets prior to the superplastic forming operation.

According to another feature of the present invention, thermally decomposing organic compounds can be utilized as stop-off materials applied to those areas where bonding is to be prevented, and which thermally decompose to gases during heat treatment following cold roll bonding. In the present invention, only sufficient of the thermally decomposing compounds are present so as to produce a slight billowing of the unbonded areas. After such partial expansion during heat treatment to obtain fine grain recrystallization, tubing communicating with the billowed areas is installed, and the entire arrangement or sandwich is placed in a heated constraining die so that controlled superplastic expansion can be carried out. Thus, an optimized controlled strain rate superplastic forming process can be carried out to fabricate the final monolithic expanded part, which may be of a final configuration which is impossible to achieve except by optimized controlled superplastic expansion.

The aging treatment of the aluminum sheets carried out prior to the cold roll bonding stage can be carried out differently on the various sheet layers in a stack or sandwich so that the final grain sizes of each lever are tailored to optimize the final superplastic expansion stage. Thus, in a three-sheet truss core sandwich, the thin center sheet can have a very fine grain size so that it can be stretched farther than the two outer sheets having relative coarse grain size. Superplastic forming expansion of this sandwich then occurs with a significantly lower flow stress in the fine-grained center sheet than in the outer sheets. The ability to tailor individual grain sizes of the sheet provides an additional degree of flexibility.

After cold roll bonding and prior to superplastic forming, in order to produce certain desired fine grain structures in one or more of the aluminum alloy sheets of the roll-bonded stack, such sheets are subjected to a rapid heating sufficient to recrystallize the material to a fine grain size.

After superplastic forming, a final heat treatment of the sheets of the resulting sandwich structure may be performed in order to impart a desired strength or toughness to the aluminum alloy.

BRIEF DESCRIPTION OF THE DRAWINGS

The invention will be more clearly understood by reference to the description below of certain preferred embodiments, taken in conjunction with the accompanying drawings wherein:

FIG. 1 is a side view of two sheets of heat treatable aluminum alloy having a stop-off compound applied at a selected area of opposing surfaces thereof and being subjected to the roll bonding process of the present invention;

FIG. 2 is a top view of the sheets of FIG. 1 after completion of the roll bonding process, showing the area where stop-off material has been applied;

FIG. 3 is a cross-sectional view of the sheets of FIG. 2, taken on line 3—3 of FIG. 2, showing a tube inserted through the upper sheet for fluid communication with the cavity formed by sheet expansion at the stopped off area in order to provide pressurized gas thereto;

FIG. 4 is a cross-sectional view similar to FIG. 3, showing the expanded sheets after completion of the superplastic forming process;

FIG. 5 is a side view illustrating the roll bonding process of the present invention employing a stack of three sheets for producing a truss core sandwich-type structure;

FIG. 6 is a perspective view of the sheets of FIG. 5 after completion of the roll bonding process, illustrating the areas where stop-off material has been applied between adjacent surfaces of the sheets;

FIG. 7 is a cross-sectional view of the assembly of sheets of FIG. 6, taken on line 7—7 of FIG. 6, in a die after the sheets have been superplastically formed in the die into a three-sheet truss core structure;

FIG. 8 is a perspective view of the sheets of FIG. 5 after completion of the roll bonding process, illustrating an injection needle inserted between edge portions of the sheets for injecting pressurized gas into the stopped off area for superplastic forming;

FIG. 9 is a perspective view of the three-sheet truss core structure shown in FIG. 7; and FIG. 10 is a perspective view of a modified form of a truss core structure which can be formed according to the invention process.

The figures of the drawings are to be understood as being only diagrammatic.

DETAILED DESCRIPTION OF THE PREFERRED EMBODIMENTS

In the present invention for the fabrication of monolithic aluminum structures, such as truss core sandwich structures, the fine grain processing of aluminum alloys disclosed in above-noted U.S. Pat. Nos. 4,092,181 and 4,222,797 is first carried out for production of a specific overaged microstructure in at least one sheet of the sheet assembly by isothermal aging or deliberate slow cool, followed by cold roll bonding, recrystallization anneal, and superplastic forming.

The individual sheets forming the final structural assembly are processed to obtain a selected grain size for each of the sheets. Thus, the process is controlled to obtain whatever grain size is desired for each of the sheets in the assembly, whether fine or coarse grain. For example, if it is desired to fabricate a three-sheet truss core final product, it is desirable that the center sheet have a very fine grain size, with the outer two sheets made coarse grained which would make them relatively stiff compared with the inner sheet at an elevated temperature, under slow strain rate conditions. Thus, the grain size in each sheet can be designed to a different specific microstructure by controlling the individual aging treatments of the sheets to obtain different microstructures, so as to allow one of the sheets, such as the center sheet and of finest grain size, to expand more easily than the others.

After the aging treatments to obtain the desired grain size for each of the sheets of the assembly, the sheets are prepared for roll bonding by applying stop-off material to those areas of the sheets where bonding is to be prevented. In preferred practice, thermally decomposing stop-off materials, such as calcium carbonate or organic compounds, such as epoxy resins, can be employed only in sufficient amounts to produce a slight billowing of the unbonded areas. This feature facilitates the location as to just where the stop-off pattern is for introduction of tubing preparatory to carrying out the superplastic forming operation. However, other methods for indexing or locating the stop-off pattern can be employed. Thus, where a non-decomposing type of stop-off material is employed, such as boron nitride, an indexing system can be employed to locate the stop-off areas, or ultrasonics can be used for this purpose.

The roll bonding of the stopped-off stack of sheets is carried out as a cold rolling operation, and the rolling mill controls can be set so as to obtain a very precise rolling reduction of each of the sheets in the assembly, e.g., 40 to as high as 80 to 90 percent reduction. After roll bonding, a rapid heating rate anneal of the assembly is carried out under conditions to recrystallize at least one of the sheets in the assembly, e.g., the center sheet of a three-sheet truss core structure, to a fine grain size, e.g., less than 14 μm in 7475 aluminum alloy. This is a sintering treatment which affects a much stronger bond between the sheets. To effect such recrystallization, a fast heating is required, e.g., up to a temperature of about 960° F. for 7475 aluminum alloy. If heating is carried out at a slow rate, a coarse grain structure will result, while still improving bond strength.

After recrystallization, the assembly can be allowed to cool down in an uncontrolled manner to allow the assembly to be readily handled at this stage. Gas needles can be introduced from the edge of the pack into the non-bonded areas of the assembly, and the assembly is then inserted into a heated tool or die for the superplastic forming operation. In the tool, the bonded pack is superplastically formed under suitable temperature and pressure conditions, such as 960° F. and 100 to 2,000 psi, by introduction of any suitable inert gas, such as nitrogen or argon, preferably the latter, into the unbonded areas between the sheets, to cause stretching of one of the sheets, such as the central sheet, at the unbonded areas into contact with the surface of the tool to form the expanded portion of the assembly.

Thus, a continuous process can be carried out where a stack of three coils or sheets of aluminum alloy pass through one end of a roll bonding apparatus and a single coil of roll bonded material exits the opposite end of the apparatus. The roll bonded product can then be trimmed, heated up rapidly to obtain recrystallization while at the same time diffusion strengthening the bond, then allowing the assembly to cool, and transferring it to a superplastic forming tool in a hot press. In some cases, the rapid heating/recrystallization stage may be effected while heating in the superplastic forming tool.

The method of the present invention applies to heat treatable aluminum alloys, such as 2,000, 5,000, 6,000, 7,000 and 8,000 series alloys, for example, alloy 7475 and alloy 2024.

As previously noted, the aluminum alloy sheets forming the aluminum structure are initially treated to obtain a specific desired microstructure. For this purpose, one or more of the sheets are subjected either to an isothermal aging or to a deliberate slow cooling procedure.

In the isothermal aging procedure, the first embodiment, the heat treatable aluminum alloy is first heated to a solid solution temperature, e.g., 920° F., at which at least some of the precipitates in the alloy are dissolved. This leaves the alloy in a coarse-grained condition. The alloy is then cooled, preferably by water quenching, to approximately room temperature, in order to rapidly cool the alloy solution. The alloy is then subjected to isothermal heating called "overaging" at a temperature below that required for the initial heating, in order to obtain a specified overaged microstructure.

The temperature and duration of the isothermal heating step may vary according to the type of alloy used. For 7000 series aluminum alloy, the alloy is preferably heated to a temperature of approximately 750° F. for a duration of about 8 hours; but a temperature as low as 660° F. for a longer duration of time can be used for the 2000 series alloys. An additional step can be carried out to soften the matrix without damaging the specific overaged microstructure needed to obtain a fine grain structure. This involves a further isothermal aging heat treatment at a lower temperature than the previous overaging treatment. The temperature and duration of this additional isothermal heating treatment may also vary according to the type of alloy used. For a 7,000 series aluminum alloy, the aluminum alloy is preferably heated to a temperaature of approximately 455° F. for a duration of approximately 24 hours to soften the alloy, followed by cooling to about room temperature. For a 2,000 series alloy, the second isothermal heating treatment is eliminated. The 2,000 series alloy is instead softened by subjecting it to a controlled slow cooling down to below approximately 390° F. This slow cooling rate is performed at a rate of approximately 18° F. to 50° F. per hour.

In place of the isothermal aging treatment described above, in a second embodiment, a deliberate or controlled slow cooling is instead performed subsequent to the initial heating step to solid solution temperature. The controlled slow cooling, for example, for 7,000 series alloys, may be performed at approximately 36° F. per hour down to about room temperature. This controlled slow cooling provides the overaged microstructure essential for subsequent development of a fine grain structure while at the same time ensuring reasonable ductility by softening the matrix.

After water quenching and isothermal heating in the first embodiment, and after the controlled slow cooling of the second embodiment, the alloy sheets are assembled or stacked, and cold rolled, as shown in FIG. 1. FIG. 1 depicts two sheets designated by the numerals 12 and 14 being subjected to pressure exerted by rollers 16 and 18. This cold rolling preferably is performed at approximately room temperature. Stop-off material 20 is appropriately positioned between the sheets 12 and 14 at selected surface areas thereof prior to the roll bonding in order to prevent bonding of the sheets at these areas 22 and 24. Cold rolling plastically deforms the sheets, and the alloy sheets can be cold rolled to obtain a substantial reduction, e.g., up to a 94 percent reduction, in thickness. The grain structure of the alloy processed by a method including cold rolling is smaller than the grain structure of similar alloys processed by a method including warm rolling. The improvement in fine grain structure of the cold rolled alloys is due to the fact that cold rolling procedures more stored plastic strain energy than warm rolling. The previously performed aging steps aid in preventing stress cracking of the alloys during the cold rolling step.

The step of plastically straining the alloy by rolling in order to produce a fine grain structure is combined with roll bonding of the sheets 12 and 14. Applying roller pressure to the sheets 12 and 14 sufficient to plastically deform and stretch the sheets results in breaking apart and separation of the aluminum oxide and other surface contaminants so as to leave spaces in between which are free of aluminum oxide and other contaminants.

The stop-off material 20 is deformable and, therefore, elongates along with the aluminum alloy; however, the aluminum oxide is not deformable and cracks up under the roller pressure leaving clean spaces or areas in between. Clean surfaces, free of aluminum oxide, are required in order to roll bond aluminum together at adjacent surfaces. Consequently, since this rolling procedure intermating surface areas in sheet faces which are clean, the rolling, if performed with sufficient pressure, can result in bonding of the sheets 12 and 14 together where stop-off material is not present. Although there remains some aluminum oxide and other contaminants between the sheets 12 and 14 during the rolling process, they are insufficient to prevent bonding of the sheets; in order for such a bond to be made, however, it is necessary that the rolling pressure stretch the sheets an amount such as to provide sufficiently large areas of the inner surfaces of the sheets 12 and 14 which are free of aluminum oxide and other contaminants.

In another embodiment, a three-sheet 12, 13 and 14 layout is shown strained and bonded by means of rollers 16, 18 in FIG. 5. The stopped off areas 22 are shown more clearly in FIG. 6.

In order to produce certain desired fine grain structures in aluminum alloys, after roll bonding, such alloys must be subjected to a rapid heating sufficient to recrystallize the matrix around the precipitates therein, and diffusion strengthen the bond. The rate of heating and final temperature of the roll bonded sheets attained during this rapid heating step depend upon the particular type of alloy used and the degree of fineness of grain structure desired. The rate of heatig can range from about 1° F. to about 1000° F. per minute, and the final temperature attained can range from about 450° F. to about 990° F., e.g., about 960° F. for 7475 aluminum alloy. During recrystallization, new grains are nucleated and grow to form a fine grain structure. The stack of sheets is then cooled, e.g., to ambient temperature.

If a thermally decomposable stop-off material has been employed, during the above-noted post-roll bonding heat treatment, the stop-off material releases a gas which forms billowed areas 22, 24, as seen in FIG. 3, providing a cavity 26 between the sheets. After recrystallization and cooling of the roll bonded stack, one or more apertures 28 may be drilled into appropriate portions of the sheets adjacent to the billowd areas 22, 24 for insertion of a needle or appropriate tube 30 therein for communication via suitable passages (not shown) between sheets 12 and 14, with such billowed areas. An appropriate sealing element 32 is placed between the tube and the aperture 28 effectively sealing the tube in the aperture.

Instead of providing billowed areas 22, 24 and inserting a gas injection tube 30 in an aperture 28 for communication with such billowed areas, as shown in FIG. 3, following roll bonding and the subsequent rapid heating step, one or more pressurized gas injection needles 30' may be inserted in the edges of the sheets, as shown in FIG. 8. A special mandrel or drill (not shown) is used to make a tunnel 34 from the edge portions of the sheets to the area 32' where stop-off material has been provided. The areas where stop-off material has been provided can be determined by a suitable indexing means (not shown). A gas injection needle, preferably of stainless steel, or a suitable tubing 30', is inserted in the tunnel 34 and sealed thereto by pressing the sheets against the needle. Pressing the sheets against the needle using high pressure provides a tight fit between the needle and the sheets. A bar or plate 36 having a groove which closely matches the needle may be positioned adjacent the needle, thereby preventing excessive deformation of the needle itself during the superplastic forming operation and providing a sealing tight fit between the needle and the sheets. The pressing operation is preferably performed at superplastic forming temperature during the subsequent superplastic forming operation in order to allow lower press loads, thereby preventing cracking of the aluminum face sheet around the injection needle.

The sheet assembly illustrated in FIG. 3 or FIG. 8 is now ready for superplastic forming, and such sheet assembly is positioned within a superplastic forming die 38, shown in FIG. 7, so that controlled superplastic expansion of the sandwich can be carried out. The die is heated to superplastic forming temperature, e.g., 960° F.

Pressurized gas, e.g., argon, at a pressure, e.g., of about 200 psi., is injected through the tube or needle 30 or 30' into the cavity 26 formed by billowed portions 22, 24, or into the stopped off areas 32'. The sheets 12, 13 and 14, as seen in FIG. 7, are thereby expanded and superplastically formed into the desired shape and structure. The superplastic expansion into the desired structure may be accomplished by conventional superplastic forming methods. For example, such a conventional method may be that described in U.S. Pat. No. 3,927,817 to Hamilton, et al; U.S. Pat. No. 4,181,000 to Hamilton; or U.S. Pat. No. 4,483,478 to Schulz.

FIG. 4 shows the expanded sheets 12 and 14 in the billowed areas 22 and 24 of FIG. 3, following superplastic forming in a die such as 38 in FIG. 7.

FIGS. 7 and 9 show the three-sheet truss core sandwich structure resulting from superplastic forming of the sheets 12, 13 and 14 of the assembly of FIG. 8, within die 38.

The method of the present invention allows the sheets 12 and 14 in FIG. 1 or 12, 13 and 14 in FIG. 5 to be individually processed prior to rolling; this allows the sheets to be processed to have grain structures different from each other. The superplastic deformation characteristics of each sheet can thus be different from each other and uniquely tailored to the requirements of the desired final structure. For example, in a standard three-sheet truss core sandwich structure, as illustrated in FIG. 7, the center sheet 13 may be processed by the method of the present invention into a very fine grain size aluminum alloy while the two outer sheets 12 and 14 may have relatively coarse grain sizes. As a result of the differing grain structures of the sheets, the center sheet may be deformed and elongated much more readily and/or to a greater extent than the outer sheets. In addition, the center sheet may be thicker than the outer sheets and still be deformed and elongated to a greater degree than the outer sheets because fine grain aluminum alloys generally have much lower superplastic flow stresses and much greater superplastic forming capabilities than relatively coarse grain aluminum alloys. Thus, there are a greater variety of combinations of grades and thicknesses of sheets which may be integrally formed into a desired structure according to the principles of the present invention.

FIG. 10 illustrates a modification of the truss core sandwich structure which can be produced according to the invention.

The following examples are illustrative of the invention as applied to a 2,000 series alloy (2024) and to a 7,000 series alloy (7475).

EXAMPLE 1—Aluminum Alloy 2024

Alloy 2024 is a precipitation hardening aluminum base alloy having a nominal composition of: 4.5% Cu, 1.5% Mg, 0.6 Mn. Two sheets of the alloy are solution treated at 920° F. for three hours and subsequently water quenched. The sheets are subjected to isothermal heating at 750° F. for eight hours in accordance with the method described in U.S. Pat. No. 4,092,181. After cooling to 390° F. at a controlled rate of about 18° F. per hour followed by air cooling to room temperature from the 390° F. temperature, as described in U.S. Pat. No. 4,490,188, a stop-off material in the form of a thermally decomposable epoxy resin is applied to preselected areas of opposing surfaces of the sheets.

The sheets then are sandwiched together, and pressure by means of rollers is applied at room temperature to the outer surfaces of the sheets. The roller pressure produces a bond at areas where stop-off material was not applied and also provides the strain energy necessary to plastically deform the alloy and imparting the required lattice strain thereto. The cold rolling may produce as much as an 80 to 94% reduction in thickness of the sheets with a correspondingly high degree of elongation of the sheets.

After the cold rolling operation, a rapid heating at about 960° F. to recrystallize the matrix around the precipitates is performed. During such heating, the stop-off material releases gas forming billowed areas between certain surface portions of the sheets. After cooling the sheets, a hole is drilled and a tube installed to provide gas access to the billowed areas, as described above. The sheets now have the desired fine or coarse grain structure in preparation for superplastic forming thereoF. The sheets are then placed in a superplastic forming die.

As the sheets are further heated to superplastic temperature at about 960° F., pressurized argon gas at about 200 psi is injected through the tube and expands the portions of the sheets during the superplastic forming operation. The sheets are expanded by means of the gas pressure until they make full contact with and conform to the shape of the die surface of the die in which the sheets have been placed.

After the sheets have been superplastically formed into the desired final monolithic expanded structure, standard final heat treatments, for example, T62 by solution treatment at about 920° F. followed by water quenching, followed by aging at 375° F. for 9 hous, may be performed in order to impart a desired strength or toughness characteristic to the aluminum alloy.

EXAMPLE 2—Aluminum Alloy 7475

Alloy 7475 is a precipitation hardening aluminum base alloy having a nominal composition of: 5.5% Zn, 2.55 Mg, 1.5% Cu, 0.3% Cr. Three sheets of the alloy are solution treated at 920° F. for one hour. The sheets are thereafter subjected to a controlled slow cooling at the rate of 36° F. per hour down to room temperature. The heating and slow cooling steps overage and soften the alloy so that it can be plastically deformed by rolling pressure without stress cracking at the edges of the sheets.

After the alloy has been properly overaged and softened, boron nitride stop-off material is applied between adjacent sheets at opposing surfaces thereoF. The sheets are subsequently subjected to roll bonding which supplies the required lattice strain energy to the alloy and simultaneously bonds the sheets together at portions where stop-off material has not been applied. After bonding, the sheets are subjected to a rapid heating to 960° F. sufficient to recrystallize the matrix around the precipitates and to result in the desired fine grain structure.

A mandrel or drill is used to provide a tunnel at the edge of the sheets leading into the area where stop-off material has been applied. A gas injection needle inserted into the tunnel and sealed thereto by an appropriate sealing compound permits gas under pressure to be introduced into the area which is stopped ofF. After the sheets are placed in a suitable die, heated to 960° F., argon gas at predetermined controlled pressure, typically 100 to 1,000 psi, is injected into the stopped off area between the sheets, superplastically deforming and elongating the sheets into the desired monolithic aluminum alloy structure.

After the sheets have been superplastically formed, the injection needle and sealing compound are removed; optionally, the sheets may be subjected to a final heating treatment in order to impart desired strength or toughness properties to the alloy.

EXAMPLE 3

Two outer sheets of alloy 2024 have a center sheet of alloy 7475 sandwiched therebetween. The outer sheets are subjected to the heating, water quenching and isothermal heating steps set forth in Example 1. The center sheet is subjected concurrently to the heating and controlled slow cooling steps of Example 2. All of the sheets are subsequently positioned so as to have surfaces opposing one another in a layered structure, and boron nitride stop-off material is appropriately positioned on selected portions between opposing surfaces of these sheets. The assembly of sheets is then subjected to cold rolling. The rolling introduces lattice strain energy into the sheets and also bonds them together at portions where stop-off material is absent.

After rolling, the entire composite structure is subjected to a rapid heating at up to about 920° F. to recrystallize the matrix around the precipitates. Since the outer sheets have been subjected to different heating and cooling treatments than the center sheet, upon recrystallization, they will acquire a different grain structure than the center sheet. There is thus formed a fine grain structure in the center sheet and coarser grain structure in the outer sheets.

After drilling an aperture in the composite structure and inserting a tube or a gas injection needle therein, as set forth in either Example 1 or 2 hereinabove, the structure is positioned in a suitable die and heated to superplastic forming temperature. Gas under pressure is injected through the tube or needle and into the stopped off areas between adjacent surfaces of the sheets, thereby expanding one or more of these sheets against the die surface and forming the desired structure. Since the center sheet has a much finer grain structure than the outer sheets, it is capable of greater plastic deformation and elongation than the outer sheets. Thus, the sheets may be expanded into a monolithic aluminum sandwich structure such as depicted in FIG. 7.

After removal from the die and cooling from the superplastic forming temperature, the structure may optionally be heated once again in order to impart desired strength and toughness characteristics to the structure.

The process of Example 3 can be modified so that the sandwich structure can have a thick central sheet relative to the outer sheets. The thicker truss core gives the sandwich structure a greater strength as desired for certain applications.

The materials of Example 3 can be modified so that the composite sandwich structure can be comprised of metal matrix reinforced outer face sheets, such as 7064 aluminum with 20 volume percent silicon carbide particulate, with fine grain 7475 aluminum as the highly superplastic center sheet.

From the foregoing, it is seen that the invention provides procedure for producing superplastically expanded monolithic aluminum structures by combining the heat treating process for controlling the grain size of specific aluminum alloy sheets forming the structure, with the roll bonding and superplastic forming steps. Thus, in forming an aluminum alloy truss core structure, the outer sheets as well as the inner sheet is treated for reduction of grain size but wherein the critical aging stage for reduction of grain size is tailored to give a structure which, after cold rolling and recrystallization stages, provides specific grain sizes in the respective sheets. The grain sizes of the sheets can be tailored quite precisely so as to obtain whatever grain size is desired, either fine or coarse grained. The size and distribution and the overall density of the overaging precipitates, the amount of rolling reduction, and finally the recrystallization heating rate all affect grain size.

Although the invention has been described in relation to the specific embodiments set forth above, many alternative embodiments, modifications and variations will be apparent to those skilled in the art in light of the disclosures set forth herein. Accordingly, it is intended to include all such alternatives, embodiments, modifications and variations that fall within the spirit and the scope of the invention as set forth in the appended claims.

What is claimed is:

1. A process for producing a monolithic aluminum alloy structure from a plurality of aluminum alloy sheets which comprises the steps of:
    imparting a desired microstructure selectively to said sheets by isothermal aging or by aging under controlled slow cooling;
    providing stop-off material at selected areas of opposing surfaces of the sheets where it is desired that the sheets not be bonded together;
    stacking the sheets;
    cold roll bonding said stack of sheets to bond those portions thereof where said stop-off material has not been applied;
    rapidly heating the roll bonded stack of sheets under conditions to recrystallize the alloy in one or more of the sheets into a fine grain structure; and
    superplastically forming said stack of sheets at elevated temperature and pressure into a desired monolithic aluminum alloy structure.

2. The process of claim 1, including the step of cooling said stack of sheets prior to said superplastic forming.

3. The process of claim 1, wherein said desired microstructure is obtained by:
    heating at least one of said sheets to a solid solution temperature to dissolve at least some of the precipitating constituents in said alloy sheet;
    cooling said at least one sheet by water quenching to a temperature below said solution temperature;
    subjecting said at least one sheet to isothermal heating at an overaging temperature above the precipitation hardening temperature but below said solution treating temperature; and
    plastically deforming and softening the alloy of said at least one sheet to obtain a fine grain microstructure by further heating and aging said alloy at a temperature equal to or below said overaging temperature.

4. The process of claim 3, said overaging temperature ranging from about 660° F. to about 750° F., and said further heating and aging temperature being at or below about 455° F.

5. The process of claim 3, said overaging temperature ranging from about 660° F. to about 750° F., and said softening comprising slow cooling down to about 390° F.

6. The process of claim 1, wherein said desired microstructure is obtained by heating at least one of said sheets to a solid solution temperature to dissolve at least some of the precipitating constituents in said alloy sheet; and
    subjecting said at least one sheet to controlled slow cooling.

7. The process of claim 6, said controlled slow cooling being carried out at a rate of about 36° F. per hour, and softening the alloy of said at least one sheet.

8. The process of claim 1, said roll bonding being carried out at ambient temperature and under conditions to effect a substantial reduction in thickness of the sheets in said stack of sheets.

9. The process of claim 1, said rapid heating to recrystallize said alloy taking place at a rate ranging from about 1° F. to about 1000° F. per minute, to a temperature of about 960° F.

10. The process of claim 1, said stop-off material being a thermally decomposable material and providing a slight billowing of adjacent sheets during said rapid heating and recrystallization step.

11. The process of claim 10, including:
    introducing tubing into the stack of sheets in communication with the billowed areas between adjacent sheets of the stack; and
    injecting gas through said tubing and into the unbonded billowed areas between the sheets of the stack to generate superplastic forming pressure during said superplastic forming step.

12. The process of claim 1, said stop-off material being a non-decomposable material, and including:
    indexing the non-bonded areas between adjacent sheets containing stop-off material;
    introducing tubing into the stack of sheets in communication with said indexed areas between adjacent sheets of the stack; and
    injecting gas through said tubing and into the indexed unbonded areas between the sheets of the stack to generate superplastic forming pressure during said superplastic forming step.

13. A process for producing a three-sheet aluminum alloy truss core sandwich structure according to claim 1, including carrying out the initial aging treatment for imparting a desired microstructure to said sheets under conditions to obtain different final grain sizes in the alloy of the respective sheets in the stack of sheets subjected to superplastic forming.

14. The process of claim 13, wherein said aging treatment is carried out so that the center alloy sheet has a very fine grain size and the outer alloy sheets have a relatively coarse grain size, whereby said center sheet can be stretched by superplastic forming farther than the two outer sheets.

15. A method for producing a monolithic aluminum or aluminum alloy structure formed of a plurality of aluminum or aluminum alloy workpiece components, comprising:
heating at least one of the workpiece components to a first desired maximum temperature;
fluid quenching said at least one of the workpiece components to a desired minimum temperature;
further heating said at least one of the workpiece components to a second desired maximum temperature below the highest temperature attained prior to fluid quenching and imparting a desired grain structure to said at least one component;
applying a stop-off material at selected areas of opposing surfaces of the workpiece components;
assembling said workpiece components into a stack;
applying cold roll bonding pressure at outer surfaces of the workpiece components in said stack, said pressure being of sufficient magnitude to plastically deform the components and to bond the components together at those areas thereof where said stop-off material has not been applied;
heating the roll bonded stack of workpiece components, said heating being at a sufficient rate and at a sufficient temperature to recrystallize the matrix around the precipitates therein; and
superplastically forming at least one of the workpiece components into the desired monolithic structure.

16. The method of claim 15, further including heating said at least one of the workpiece components to a third desired maximum temperture subsequent to said heating to the second desired maximum temperature, the third desired maximum temperature being below the second desired maximum temperature.

17. The method of claim 15, wherein said desired minimum temperature is approximately room temperature.

18. The method of claim 15, wherein said stop-off material is thermally decomposable and releases gas upon heating to a selected temperature so that at least one of the workpiece components billows outwardly in the selected areas where the stop-off material has been applied, whereby the workpiece components adjacent to the selected areas at least partially define a cavity between the workpiece components.

19. The method of claim 18, further including providing a tube extending into the stack of workpiece components and in communication with the billowed areas for passage of a pressurized fluid therethrough and into the cavities, for said superplastic forming of at least one of the workpiece components.

20. The method of claim 15, further including cooling at least one of the workpiece components at a controlled rate to below approximately 390° F., following said further heating step, the cooling rate being in the range of approximately 18° F. to 50° F. per hour.

21. The method of claim 15, wherein at least one of the workpiece components comprises 7,000 series aluminum alloy material.

22. The method of claim 15, wherein at least one of the workpiece components comprises 2,000 series aluminum alloy material.

23. The method of claim 15, wherein said first desired maximum temperature is approximately 920° F.

24. The method of claim 15, wherein said second desired maximum temperature is approximately 750° F. for a duration of approximately 8 hours.

25. A method of producing a monolithic aluminum or aluminum alloy structure formed of a plurality of aluminum or aluminum alloy sheets, comprising:
heating at least one of the sheets to a desired maximum temperature;
cooling the sheets at a controlled rate to a desired minimum temperature and imparting a desired grain structure to said at least one sheet;
providing stop-off material at selected areas of opposing surfaces of the sheets where it is desired that the sheets not be bonded together;
assembling said sheets into a stack;
applying cold roll bonding pressure at outer surfaces of the sheets in said stack, said pressure being of sufficient magnitude to plastically deform the sheets and to bond the sheets together at those areas thereof where stop-off material has not been applied;
further heating the roll bonded stack of sheets in order to recrystallize the matrix around the precipitates in the sheets and diffusion strengthen the bond; and
superplastically forming at least one of the sheets into the desired monolithic structure.

26. The method of claim 25, wherein the desired maximum temperature is approximately 920° F.

27. The method of claim 25, wherein said cooling is carried out by water quenching.

28. The method of claim 25, wherein the cooling is performed at the rate of 36° F. per hour.

29. The method of claim 25, wherein the desired minimum temperature is approximately room temperature.

30. The method of claim 25, said further heating being carried out at a rate ranging from about 1° F. to about 1,000° F., per minute, to a final temperature ranging from about 450° F. to about 990° F.

31. The method of claim 25, wherein one of the sheets has a grain structure different from at least one of the remaining sheets prior to said superplastic forming step, so that at least one of the sheets has a superplastic deformation property different from at least one of the other sheets.

32. The method of claim 25, wherein said stop-off material is thermally decomposable and releases a gas upon heating to a selected temperature during said further heating step, to produce a billowed area at adjacent surfaces of the sheets, the billowed area defining a cavity and allowing insertion of a tube through at least one of the sheets, the tube communicating with the cavity to provide pressurized gas for superplastic forming of the sheets into the desired structure.

33. A method of producing a monolithic aluminum or aluminum alloy structure formed of a plurality of heat treatable aluminum or aluminum alloy sheets, comprising:
heating the sheets to approximately 920° F.;
fluid quenching the sheets to a desired minimum temperature immediately after said heating;
isothermally heating the sheets at approximately 750° F. for approximately 8 hours;
isothermally heating the sheets at approximately 455° F. for approximately 24 hours in order to soften the sheets;

positioning the sheets in a stack so that the sheets have opposing surfaces;

applying stop-off material to at least one selected areas of the opposing surfaces of the sheets in order to prevent bonding of the sheets at said area;

cooling the sheets to approximately room temperature;

applying a rolling pressure at ambient temperature to outer surfaces of the sheets in order to concurrently roll bond the sheets at desired portions thereof and plastically deform the sheets;

rapidly heating the sheets to a desired maximum temperature to recrystallize the alloy in said sheets, said rapid heating being sufficient to provide a desired fine grain structure to the sheets;

providing a tunnel between at least two of the opposing surfaces of the sheets at edge portions of the sheets for insertion of a tube therebetween, the tube providing a passageway for pressurized gas between the sheets to said area where the stop-off material has been applied;

heating the sheets to superplastic forming temperature; and injecting pressurized gas through the tube into the area between the sheets where stop-off material has been applied, the pressurized gas being sufficient to superplastically deform and elongate at least a portion of the sheets in order to provide the desired structure.

* * * * *